United States Patent
Arrizabalaga et al.

(10) Patent No.: US 8,602,761 B2
(45) Date of Patent: Dec. 10, 2013

(54) SYSTEM FOR AUTOMATICALLY PRODUCING WIND TURBINE BLADES

(75) Inventors: César Arriola Arrizabalaga, Elgoibar (ES); Xabier Eraña Achaga, Aretxabaleta (ES); Mariano Sastre Sánchez, Madrid (ES); Fernando Martínez Herraiz, Madrid (ES)

(73) Assignee: Danobat, S. Coop, Elgoibar (Guipuzcoa) (ES)

( * ) Notice: Subject to any disclaimer, the term of this patent is extended or adjusted under 35 U.S.C. 154(b) by 0 days.

(21) Appl. No.: 13/321,619

(22) PCT Filed: May 20, 2010

(86) PCT No.: PCT/ES2010/000219
§ 371 (c)(1),
(2), (4) Date: Feb. 2, 2012

(87) PCT Pub. No.: WO2010/133729
PCT Pub. Date: Nov. 25, 2010

(65) Prior Publication Data
US 2012/0128810 A1    May 24, 2012

(30) Foreign Application Priority Data
May 21, 2009    (ES) .................................. 200901263

(51) Int. Cl.
*B29B 11/04* (2006.01)
*B29B 11/16* (2006.01)
*B29C 70/38* (2006.01)

(52) U.S. Cl.
USPC ................... 425/91; 425/90; 425/92; 425/98; 425/112; 425/117; 425/184; 425/185; 425/374; 425/394; 156/350; 156/358

(58) Field of Classification Search
USPC ......... 425/90, 91, 92, 98, 117, 184, 185, 112, 425/394, 374, 382; 156/349, 350, 382, 358
See application file for complete search history.

(56) References Cited

U.S. PATENT DOCUMENTS

| | | | |
|---|---|---|---|
| 7,048,828 B2 * | 5/2006 | Wiedow et al. | 162/280 |
| 2004/0226651 A1 | 11/2004 | Ledet et al. | |
| 2004/0232600 A1 * | 11/2004 | Miller | 264/511 |
| 2006/0003096 A1 * | 1/2006 | Hartmann et al. | 427/207.1 |
| 2006/0034971 A1 * | 2/2006 | Olsen et al. | 425/451.5 |
| 2006/0260751 A1 * | 11/2006 | Lauder et al. | 156/382 |
| 2007/0029030 A1 * | 2/2007 | McCowin | 156/173 |

* cited by examiner

*Primary Examiner* — Robert B Davis
*Assistant Examiner* — Lawrence D Hohenbrink, Jr.
(74) *Attorney, Agent, or Firm* — Lucas & Mercanti, LLP

(57) ABSTRACT

The invention relates to a system for the automatic manufacture of wind turbine blades using die halves (2,3) wherein by applying dry fiber mats, two complementary shells are molded whereby the attachment thereof will result in the blade to be obtained, head-bearing means (5,6) being arranged with respect to the die halves (2,3), said means being susceptible to selectively having demolding agent, paint, adhesive application accessories or a machining accessory, and head-bearing means (13) having a functional assembly capable of applying the dry fiber mats in the die halves (2,3).

7 Claims, 5 Drawing Sheets

SYSTEM FOR AUTOMATICALLY PRODUCING WIND TURBINE BLADES

This application is a 371 of PCT/ES2010/000219 filed May 20, 2010, which in turn claims the priority of ES P200901263 filed May 21, 2009, the priority of both applications is hereby claimed and both applications are incorporated by reference herein.

FIELD OF THE ART

The present invention relates to the manufacture of wind turbine blades, proposing a system whereby said manufacture is automatic based on using dry fiber mats, i.e., not impregnated, being impregnated with the resin necessary for consolidation during the manufacturing process.

STATE OF THE ART

There are two options among the processes known for manufacturing wind turbine blades, one of which consists of using pre-impregnated composite mats, whereas in the second option basic raw material based on dry fiber mat, which will be referred to hereinafter as "cloth" is used, the said "cloth" mats being supplied by means of reels that can have dimensions which exceed even 4,000 mm in width.

Until today, all known processes for manufacturing wind turbine blades, by means of dry fiber "cloth" are completely manual processes in all their phases, such that, for example, to manufacture one blade a day, over 50 operators in three shifts are required, which entails a slow and expensive process and furthermore does not offer suitable finish conditions, uniformity, precision, etc., since the different phases are performed manually and completely dependent on the operators' criteria, training and skill.

OBJECT OF THE INVENTION

The invention proposes a system for the manufacture of wind turbine blades by means of forming two halves like "shells" in respective die halves, based on a dry fiber "cloth" with an embodiment implementing an automatic process, overcoming the drawbacks of the conventional system that is implemented manually.

According to this system object of the invention, a common gantry structure is arranged with respect to the die halves for forming the "shell" components of the blade, said structure being provided with two heads which are susceptible to incorporating paint, adhesive or demolding agent application accessories, and machining accessories for forming rough surfaces in the adhesive application areas, as well as for the planning and outer sanding of the area of attachment of the "shells", whereas another individual gantry structure provided with two heads intended for placing the "cloth" in the application areas is arranged with respect to each die half, said heads incorporating cutting elements for trimming the "cloth" mat which is applied when needed according to the shape of the application areas so that there are no surplus parts.

Nozzle-bearing accessories which are replaced in the heads of the common gantry structure arranged above the die halves are used for applying paint, adhesive and demolding agent, the corresponding deposits of the products to be applied being associated with said common gantry structure, whereas an application control system is arranged with respect to the system for applying those products.

Said product application control can be by means of measuring the product outflow rate through the application nozzles combined with a machine vision system for viewing the surface of the product that is applied, such that the thickness of the application layer with a controlled forward movement speed is verified by means of the flow rate and surface color parameters. Another application control option is to use two line lasers combined with a machine vision system such that the thickness of the applied product layer is determined by means of controlling the geometry of the application areas.

The heads of the individual gantry structures of the die halves are provided for different widths of the "cloth" to be applied, there being a control system by means of line laser and machine vision with respect to said heads to assure the correct placement of the "cloth" in the application areas.

A system is thereby obtained which automatically performs the operations of the process for the manufacture of wind turbine blades, avoiding the mistakes that may result from depending on people affecting the conventional system of the same application, while at the same time the process is simplified and the blade manufacturing time reduced.

DETAILED DESCRIPTION OF THE INVENTION

The object of the invention relates to a system for the manufacture of wind turbine blades by means of applying dry fiber "cloth" mats (1), above two die halves (2 and 3) where respective halves or "shells" are formed making up the body of the desired blade when attached to one another.

The process for the manufacture of the wind turbine blades according to the proposed system is done by means of an installation consisting of a common gantry structure (4) arranged above the assembly of the two die halves (2 and 3), one of which is fixed and the other one being susceptible of being turned over onto the former to attach the "shells" formed therein in opposition.

Figure 1:
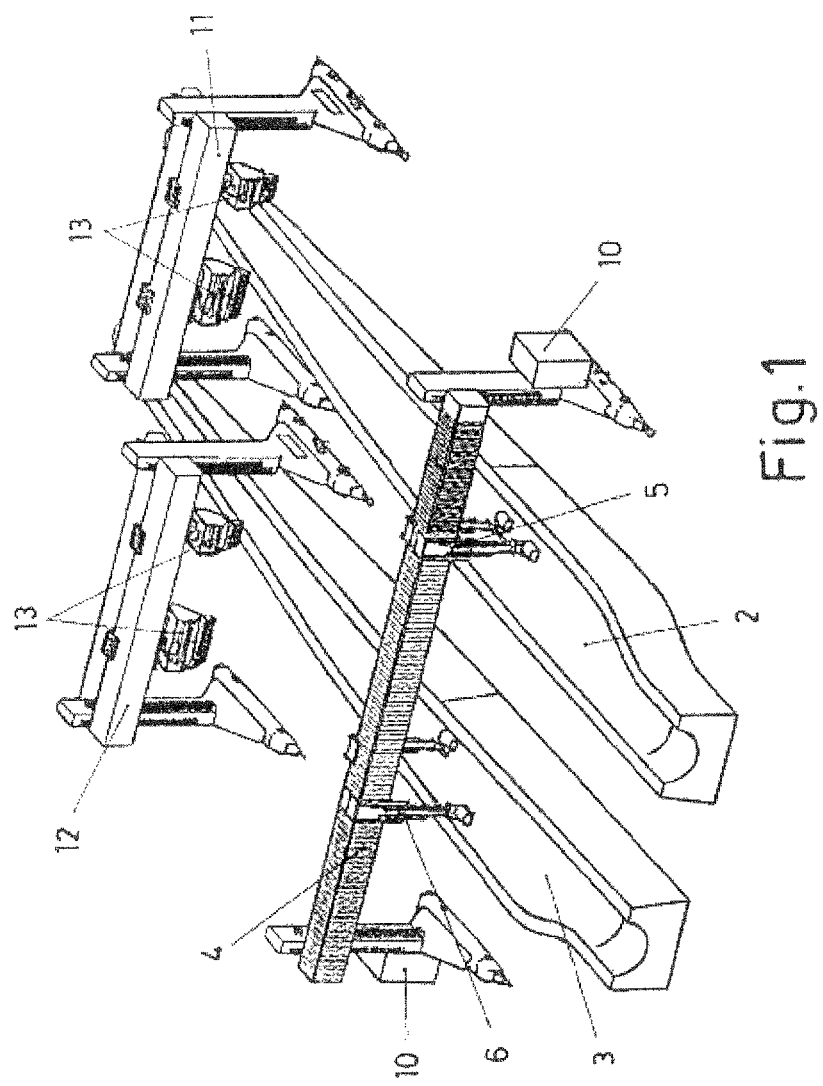
FIG. 1 shows a general perspective view of the installation of the proposed system according to one embodiment.
Figure 2:
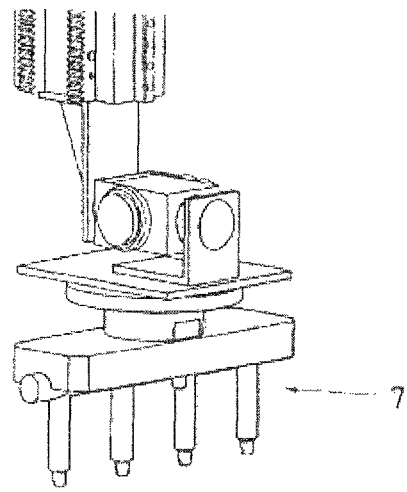
FIG. 2 shows a perspective view of a multi-nozzle paint application accessory which can be incorporated in the heads of the common gantry structure that is arranged above the two die halves.
Figure 3:
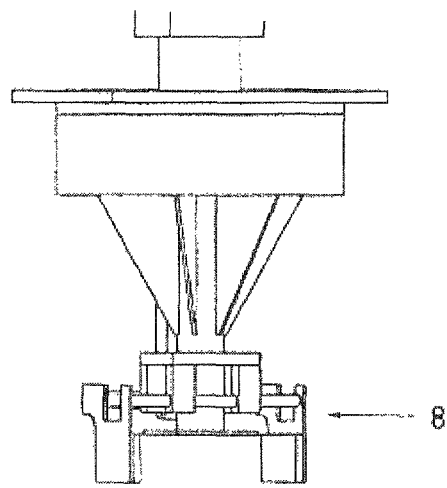
FIG. 3 shows a perspective view of an adhesive application accessory which can be incorporated in the same heads of the common gantry structure arranged above the die halves.
Figure 4:
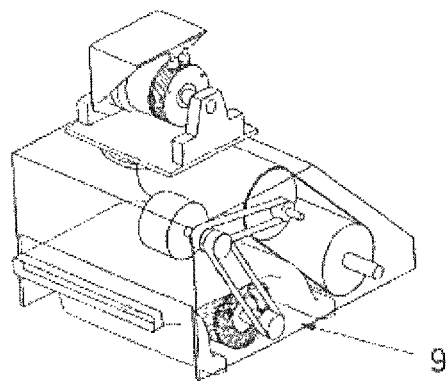
FIG. 4 shows a perspective view of a machining accessory which can in turn be incorporated in said heads of the common gantry structure arranged above the die halves.

Two heads (5 and 6) intended for operating respectively on the die halves (2 and 3) are arranged in said gantry structure (4), said heads (5 and 6) being able to have replaceable accessories for performing different types of operations, such as a multi-nozzle paint application accessory (7), depicted in FIG. 2, an adhesive application accessory (8), depicted in FIG. 3, and a machining accessory (9), for example for rough sanding, depicted in FIG. 4; there being deposits (10) containing the products to be applied in the gantry structure (4) itself.

The accessories (7, 8 and 9) as well as the different multi-nozzle paint or demolding agent application accessories (7) are automatically replaced from a warehouse for the operations in which each of them is required.

Respective individual gantry structures (11 and 12) are further arranged above each of the die halves (2 and 3), each of which incorporates two heads (13) intended for applying the "cloth" mats (1) in the corresponding areas of the die halves (2 and 3).

The heads (13) of each individual gantry structure (11 and 12) have the same structural formation but a different width, such that one of them can be used with "cloth" mats (1) having a width less than a certain value, whereas the other one can be used with "cloth" mats (1) having a greater width.

Figure 5:
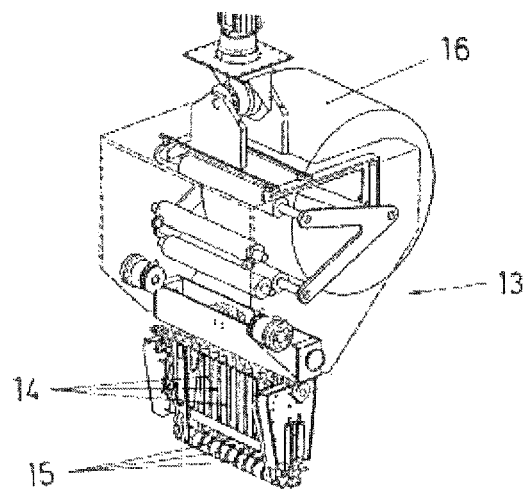
FIG. 5 shows a perspective view of a "cloth" mat applicator head of the type in the individual gantry structures arranged above the die halves.
Figure 6:
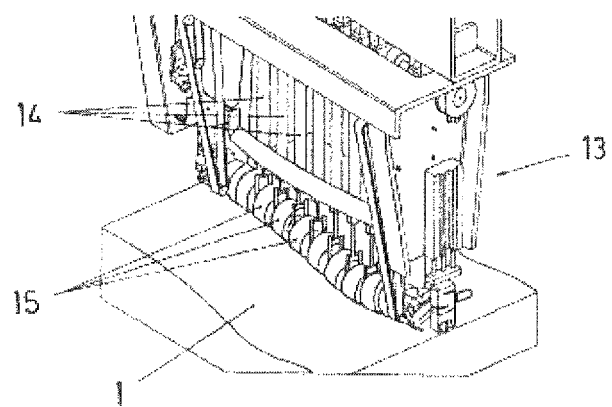
FIG. 6 is a perspective view of an enlarged detail of the end part of the head of the preceding figure, showing the adaptation to the shape of an application area.
Figure 7:
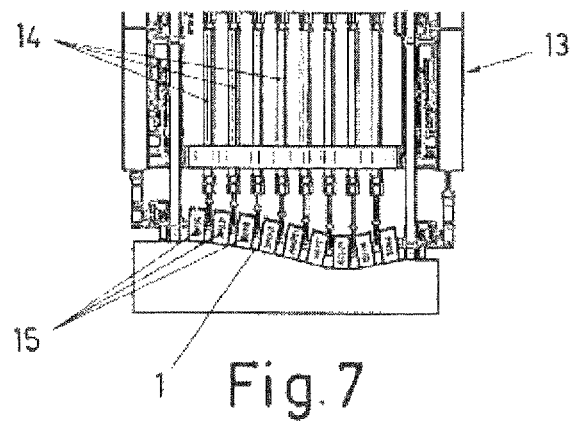
FIG. 7 is a front view of the detail of the preceding figure.
Figure 8:
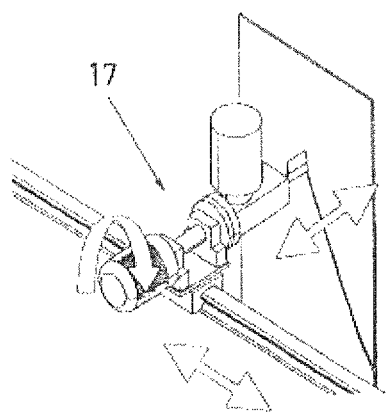
FIG. 8 is a perspective view of an enlarged detail of the cutting element incorporated in the "cloth" mat applicator heads.
Figure 9:
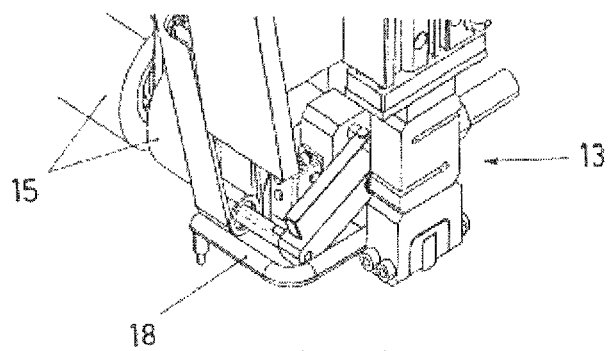
FIG. 9 is a perspective view of an enlarged detail of adhesive projection element incorporated in the applicator heads for fixing the "cloth" in the areas where it tends to fall.

As can be seen in FIGS. 5 to 7, each of said heads (13) is made up of a plurality of pneumatic cylinders (14), which are connected at the end of their rod to a shaft where there is assembled a series of rollers (15), the assembly of which can be adapted to different curve shapes, forming a continuous hold-down plate for applying the "cloth" mats (1) on the different areas of the die halves (2 and 3). The assembly of the pneumatic cylinders (14) together with the rollers (15) associated with them are arranged in an assembly which allows adjusting the width for being adapted to the width of the "cloth" mats (1) used in each case.

An automatic loader (not depicted) incorporating the reels (16) of the "cloth" mats (1) is provided in a threading arrangement with respect to said heads (13), which allows achieving reel (16) changing times that are less than fifteen seconds. This is an advantageous reduction of the process time for manufacturing wind turbine blades, because manufacturing a blade requires placing over two-hundred layers of "cloth" (1) to form each "shell", it being necessary to move between forty and fifty reels, over half of which are large, being able to weigh nine-hundred kilos, making it necessary to change the reels in the process for manufacturing a blade about a hundred times.

Therefore, the wind turbine blade is manufactured with the system of the invention as follows:

The demolding agent is applied in the die halves (2 and 3) and then this is painted with a paint referred to as gel-coat, intended for forming the outer surface of the blade to be manufactured through the appropriate multi-nozzle accessories (7).

For the mentioned demolding agent and gel-coat paint application, it is envisaged that the installation itself incorporates an application control system (not depicted) which control can be by means of measuring the outflow rate from the corresponding multi-nozzle accessory (7), combined with a machine vision system which controls the color of the surface of the applied product, such that with the flow rate and color parameters it is verified through an established program that the application of the product is correct, because a specific flow rate and controlled forward movement speed determine the application material thickness. Said control can also be done by using two line lasers combined with a machine vision system, such that the assembly allows controlling the geometry of the areas of the die halves (2 and 3), determining the thickness of the necessary layer of material.

After applying the gel-coat paint, the heads (13) of the individual gantry structures (11 and 12) begin operating, depositing the "cloth" mats (1) on the die halves (2 and 3).

Said heads (13) have a cutting system (17), whereby they cut the "cloth" (1) that is applied so that it is within established tolerances depending on the areas of the die halves (2 and 3) where the cloth will be applied, i.e., the "cloth" (1) to be applied is patterned in the heads (13) themselves, so that there is no projecting surplus on the edges of the formation of the "shells" component of the blade being manufactured.

The heads (13) themselves further have an adhesive projection nozzle (18) for fixing the "cloth" (1) in the application areas where it tends to fall as it is vertical. Said nozzle (18) can be replaced with a sewing unit for fixing the "cloth" (1) in the mentioned areas where it tends to fall.

A control system (not depicted) is also arranged with respect to said heads (13), said control preferably being by means of line laser and machine vision to assure that the "cloth" mats (1) are suitably arranged in the placement areas without creases, air pockets or similar defects.

Once the entire "cloth" (1) assembly for forming the corresponding "shell" in each die half (2 and 3) is deposited, the necessary resin is infused and it is cured, to later machine the areas intended for attaching the "shells" to one another by means of the heads (5, 6) of the gantry structure (4) themselves for the purpose of determining a rough surface in said areas which allows better actuation of the bonding adhesive.

To that end, the areas to be machined and the bonding adhesive application path are established by means of the line laser and machine vision systems, said adhesive being applied by means of the heads (5, 6) with the corresponding accessory (8) incorporated therein.

After applying the adhesive, the movable die half (3) is turned over onto the fixed die half (2) such that the "shells" formed therein are attached to one another by the glued areas, determining the assembly of the wind turbine blade.

The die halves (2 and 3) are removed when the blade is thus formed, and all the dimensions and shapes are determined through the line laser and machine vision systems for the same heads (5, 6) of the gantry structure (4) to plane and sand the outer part of the attachment between the "shells" so that the outer surface of the formed blade is perfectly uniform, so the attachment line between the "shells" is checked with accuracy by means of line laser and machine vision systems, planning and sanding the defined path based on said attachment line and the areas located thereon which need to be touched up. A protective layer using gel-coat paint or other materials is applied on the assembly of the blade after planning and sanding the attachment to prevent external agents from affecting the outer surface.

For the sake of simplicity of the description, the installation of the system has been considered with two die halves (2 and 3) for the manufacture of a wind turbine blade, but the system is also applicable for manufacturing several blades at a time, the gantry structures (4, 11 and 12) being able to be shared either by moving said structures with respect to the different assemblies of die halves (2 and 3), or by moving the latter with respect to the mentioned structures.

The functional concept of the system is also viable if robotic arms instead of gantry structures (4, 11 and 12) are used to support and move the heads for performing the different functions.

In the same sense, a gantry structure (4) has been provided for incorporating the elements for "dirty" operations (painting, adhesive application, machining) separately from the operating elements for placing the "cloths" (1), but it is functionally possible to arrange all the operating element in a single common gantry structure.

The invention claimed is:

1. A system for the automatic manufacture of wind turbine blades, comprising:
a movable die half;
a fixed die half;
a plurality of head-bearing means for selectively having a multi-nozzle demolding agent, a paint application accessory, an adhesive application accessory, or a machining accessory, arranged with respect to the movable die half and the fixed die half; and
a plurality of cloth mat applying means for applying dry fiber cloth mats and resin necessary for consolidation curing of the mats in each of the movable die half and the fixed die half,
the entire assembly operating automatically to form a complementary shell molded in each of the die halves whereby the attachment of the die halves determines the blade to be formed.

2. The system for the automatic manufacture of wind turbine blades according to claim 1, wherein a common gantry structure is arranged above both the movable die half and the fixed die half,
the plurality of head-bearing means being incorporated on the common gantry structure,
each of the plurality of head-bearing means operating on the die halves, and
the common gantry structure having a deposit structures having the products to be applied by said plurality of head-bearing means.

3. The system for the automatic manufacture of wind turbine blades according to claim 1, wherein an individual gantry structure is arranged above each one of the movable die half and the fixed die half,
the plurality of cloth mat applying means assembled in each individual gantry structure having identical structural formation but different widths for applying therewith cloth mats of different widths in the respective die halves.

4. The system for the automatic manufacture of wind turbine blades according to claim 3, wherein each one of the plurality of cloth matt applying means comprises a plurality of pneumatic cylinders connected at an end of rods to a shaft where there is assembled a series of rollers, the assembly of which can adopt variable curve shapes, determining a continuous hold-down plate for applying the cloth mats on the different areas of the die halves,
a width of the assembly being adjustable to cloth mats of different widths.

5. The system for the automatic manufacture of wind turbine blades according to claim 3, wherein the plurality of cloth mat applying means have a cutting system for trimming the cloth mats depending on the areas of the die halves on which they are going to be applied.

6. The system for the automatic manufacture of wind turbine blades according to claim 3, wherein the plurality of cloth mat applying means have a system for fixing the cloth mats by gluing or sewing them in vertical areas where they tend to fall.

7. The system for the automatic manufacture of wind turbine blades according to claim 1, wherein controls formed by a combination of a line laser and a machine vision system are arranged for the operating functions of applying products and of placing the cloth mats, whereby the application areas in the die halves and the thickness of the layers that are applied are determined.

* * * * *

UNITED STATES PATENT AND TRADEMARK OFFICE
CERTIFICATE OF CORRECTION

PATENT NO.       : 8,602,761 B2                                                   Page 1 of 1
APPLICATION NO. : 13/321619
DATED            : December 10, 2013
INVENTOR(S)      : Arrizabalaga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 52 days.

Signed and Sealed this
Twenty-second Day of September, 2015

Michelle K. Lee
*Director of the United States Patent and Trademark Office*